United States Patent [19]

Cummins et al.

[11] Patent Number: 5,482,421
[45] Date of Patent: Jan. 9, 1996

[54] DRUM LIFTER AND TRANSPORTER WITH INTEGRAL FORCE MEASURING DEVICE

[75] Inventors: Millard Cummins, Bexley; Robert S. Korb, Columbus, both of Ohio

[73] Assignee: The Thurman Manufacturing Co., Columbus, Ohio

[21] Appl. No.: 262,819

[22] Filed: Jun. 21, 1994

[51] Int. Cl.⁶ .................................................. B60P 5/00
[52] U.S. Cl. ........................... 414/21; 414/621; 177/140
[58] Field of Search ............................ 414/21, 444, 457, 414/459, 460, 621, 622; 177/130, 136, 139–140, 152

[56] References Cited

U.S. PATENT DOCUMENTS

| | | |
|---|---|---|
| 486,742 | 11/1892 | Herzberg et al. . |
| 755,902 | 3/1904 | Martin ..................................... 177/140 |
| 825,459 | 7/1906 | Harrison ................................. 177/140 |
| 1,033,277 | 7/1912 | Seashole . |
| 1,096,874 | 5/1914 | Malsburg . |
| 1,293,699 | 2/1919 | Cannon . |
| 1,342,246 | 6/1920 | Bishop . |
| 1,520,047 | 12/1924 | Alden et al. . |
| 2,028,976 | 1/1936 | Goff ........................................... 280/53 |
| 2,598,515 | 5/1952 | Dickson ................................... 414/622 |
| 2,848,128 | 8/1958 | Thompson ............................... 414/621 |
| 3,009,592 | 11/1961 | Troller .................................... 414/622 |
| 3,351,370 | 11/1967 | Olson ......................................... 294/64 |
| 3,521,775 | 7/1970 | Vermette . |
| 3,760,964 | 9/1973 | Trapp . |
| 3,910,363 | 10/1975 | Airesman ........................... 177/140 X |
| 3,998,284 | 12/1976 | James ................................. 177/140 X |
| 4,029,230 | 6/1977 | Bolduc et al. . |
| 4,130,212 | 12/1978 | Gatilao .................................... 414/622 |
| 4,239,443 | 12/1980 | Rysewyk ................................. 414/618 |
| 4,421,186 | 12/1983 | Bradley ................................... 177/139 |
| 4,508,485 | 4/1985 | Mlinaric et al. ........................ 414/458 |
| 4,533,009 | 8/1985 | Evans ................................ 177/140 X |
| 4,741,659 | 5/1988 | Berg ....................................... 414/450 |
| 4,921,385 | 5/1990 | Okuno ...................................... 414/21 |
| 5,020,963 | 6/1991 | Okada ................................ 414/621 X |
| 5,122,027 | 6/1992 | Tabayashi .............................. 414/622 |
| 5,427,494 | 6/1995 | Fitzgerald ............................... 414/459 |

Primary Examiner—Michael S. Huppert
Assistant Examiner—James W. Keenan
Attorney, Agent, or Firm—John L. Gray

[57] ABSTRACT

The invention consists of an improvement to a four-wheel device used to lift drums with compressed air stored in an on-board storage tank without special straps, tools or clamps that allows the operator to lift the drum with no physical stress and to roll the drum to another location with minimum effort and allows force measuring (weighing) of the drum.

7 Claims, 4 Drawing Sheets

DRUM LIFTER AND TRANSPORTER WITH INTEGRAL FORCE MEASURING DEVICE

BACKGROUND OF THE INVENTION

Drum lifters and transporters are very common throughout the chemical, as well as other industries. However, prior to Applicant's invention, the process of moving a drum to be weighed on a scale was time consuming and hazardous. This process required that the drum be lifted and moved to the static scale, placed on the scale, weighed, lifted from the scale and moved to storage. This old process of moving the drum to a static scale generally involved the use of a fork lift truck or a two wheel industrial truck, each having certain disadvantages not found in Applicant's invention.

Moving the drum to a static scale with a fork lift truck involves the use of an expensive piece of equipment which has inherent maintenance problems along with other limitations. A certified fork lift truck operator is required in most jurisdictions and the hydraulics of a fork lift truck can easily be bent or otherwise damaged by a drum.

Furthermore, using a two wheeled industrial truck to move a drum to a static scale presents certain safety problems. A filled drum weighs approximately 500 pounds. A strong individual has to tip the drum so that the industrial truck can be inserted under the bottom of the drum. This procedure has resulted in many industrial injuries including lost fingers, cut or crushed toes, mangled arms and back problems. In addition, while moving a drum by this method, if the operator trips or falls, the drum is likely to fall on the operator with devastating results. Therefore, a need exists for an efficient and safe way to weigh and transport a drum.

SUMMARY OF THE INVENTION

Applicant has solved this need by providing a drum lifter that provides a safe and efficient way to weigh and transport a drum. The instant invention does not require excessive physical force nor does it require wrap around straps in order to engage, lift, weigh and subsequently transport a drum or other container. The invention uses a compressed air tank and air cylinder to enable its supports to engage the upper ring or lip of a drum at two points other than at the diameter of the ring thus permitting the lower portion of the drum to swing back slightly so that the lower back portion of the drum rests against the rear rollers to reduce friction during the weighing process. This device, without the weighing feature, is disclosed and claimed in copending U.S. patent application Ser. No. 08/024,123, Fitzgerald, entitled "Container Carrier."

Applicant's invention includes a load cell, a ball/socket coupling device, and a battery operated digital weight indicator with a connecting threaded rod between the three. The ball/socket coupling device is mounted on the threaded rod between the lift arm of the drum mover and the load cell. The load cell is mounted on the threaded rod connecting the ball/socket coupling device and the air cylinder. When the air cylinder is actuated to lift the drum, the load cell measures the strain and the battery operated digital weight indicator displays the weight of the drum. This weighing operation is almost instantaneous and can be continuous.

It is therefore an object of this invention to provide a safe and efficient means for transporting and weighing a drum.

It is further object of this invention to provide such a device which may accommodate a variety of objects.

These, together with other objects and advantages of the invention will become more readily apparent to those skilled in the art when the following general statements and descriptions are read in the light of the appended drawings.

DETAILED DESCRIPTION OF THE INVENTION

Figure 1:
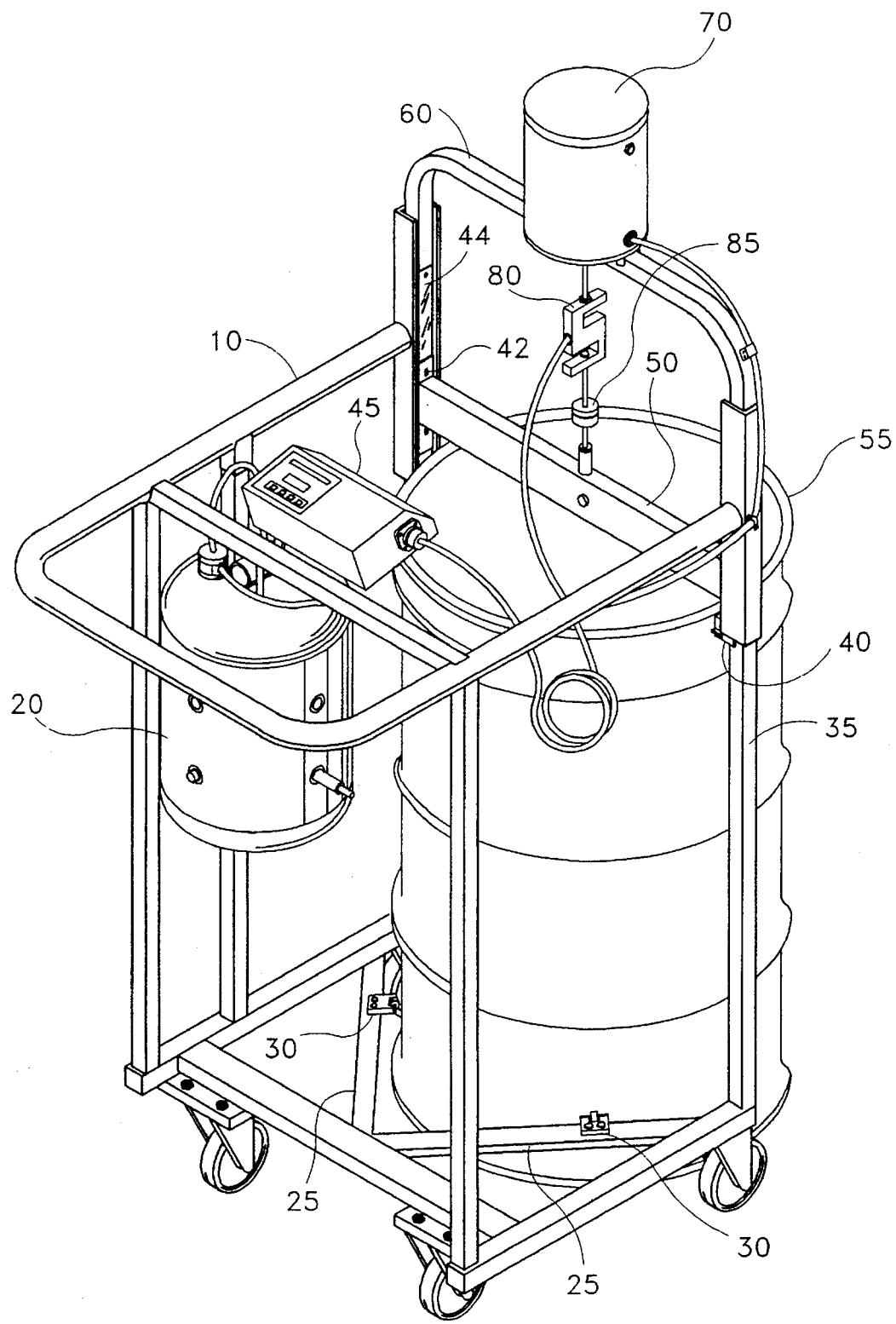
FIG. 1 is a perspective view of applicant's preferred embodiment of this invention.

Referring now more particularly to the drawings, FIG. 1 shows applicants' preferred embodiment of the invention generally at 10 which is a four-wheeled device used to lift a drum 55 with compressed air without special straps, tools or clamps that allows the operator to lift, weigh and move the drum 55 to another location with minimum effort. In this embodiment of applicant's invention there is a compressed air tank 20, rear rollers 30-30, vertical supports 35-35, drum lift supports 40-40, radial ball beatings 42-42, stainless steel bearing raceways 44-44, a digital read-out scale 45, an air cylinder 70, a load cell 80, and a ball/socket coupling device 85. The load cell 80 can be better observed by referring to FIG. 2.

Figure 2:
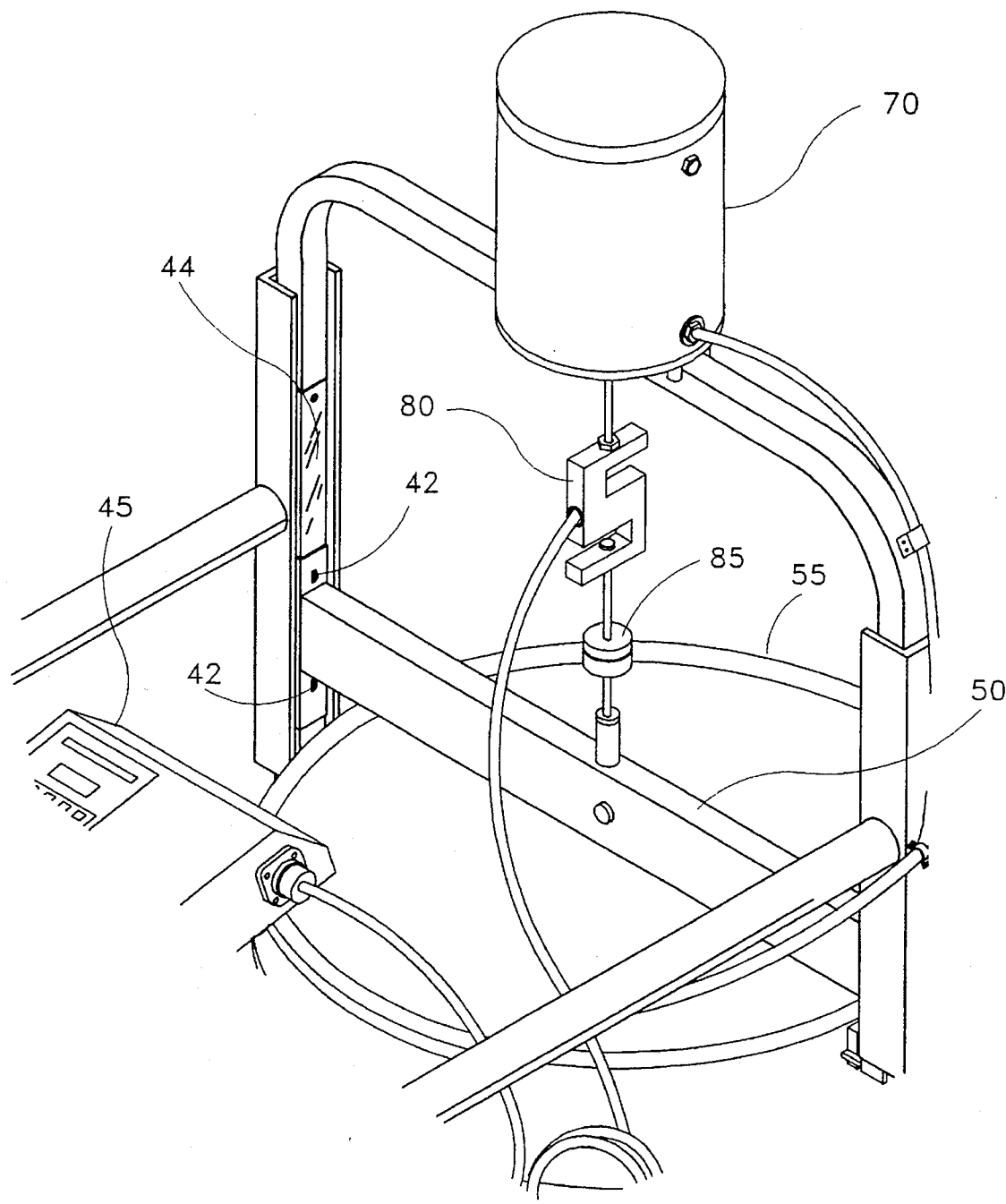
FIG. 2 is a perspective view of the ball/socket coupling device, a load cell which is connected to a digital read-out scale, and an air cylinder that is connected to the compression air tank which is used to lift the raising bar and the drum.

In FIG. 2 the ball/socket coupling device 85 is attached to a threaded rod between the load cell 80 and the raising bar 50. The load cell 80 is positioned between the air cylinder 70 and the ball/socket coupling device 85. The load cell 80 is connected to a digital read-out scale 45. The air cylinder 70 will use the load cell 80 to pull up the raising bar 50 which in turn will lift up the drum 55 and permit the load cell 80 to transmit the force measuring (weight) information to the digital read-out scale 45. The ball/socket coupling device 85 will allow for rotational freedom in all axes of the raising arm 50 to reduce friction and minimize off center loading on the load cell 80.

Figure 3:
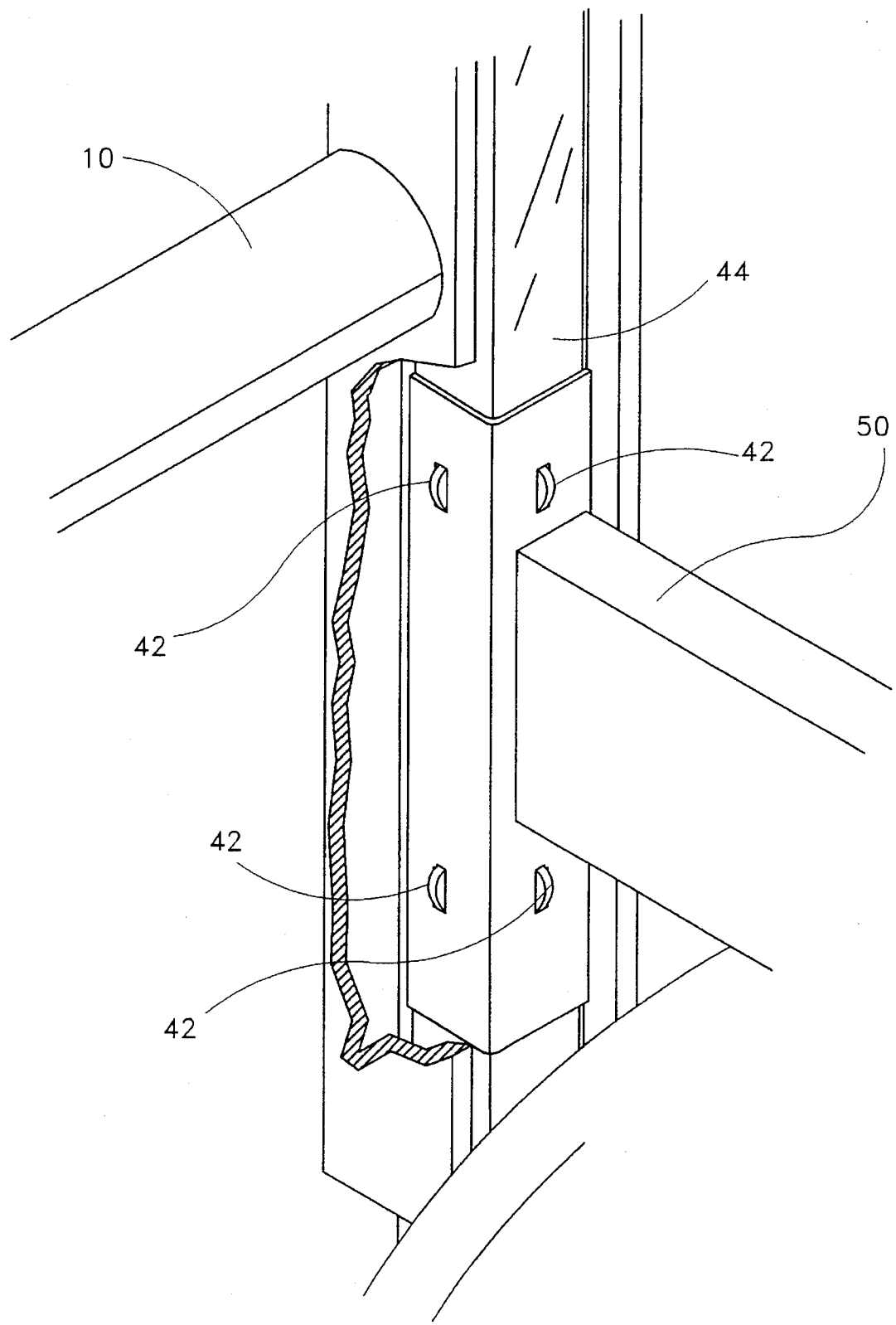
FIG. 3 is a sectional view of several radial ball bearings and a bearing raceway that has been attached to the vertical support to minimize friction when the unit slides up and down during weighing.

Referring more particularly to FIG. 3, during the lifting of the drum 55 the raising bar 50 will slide up and down on stainless steel bearing raceways 44-44 that have been attached to each of the vertical support bars 35-35 to minimize friction. The radial ball bearings 42-42, which are connected to the raising bar 50, will travel up and down the stainless steel beating raceways 44-44 to reduce friction during the weighing of the drum 55.

Figure 4:
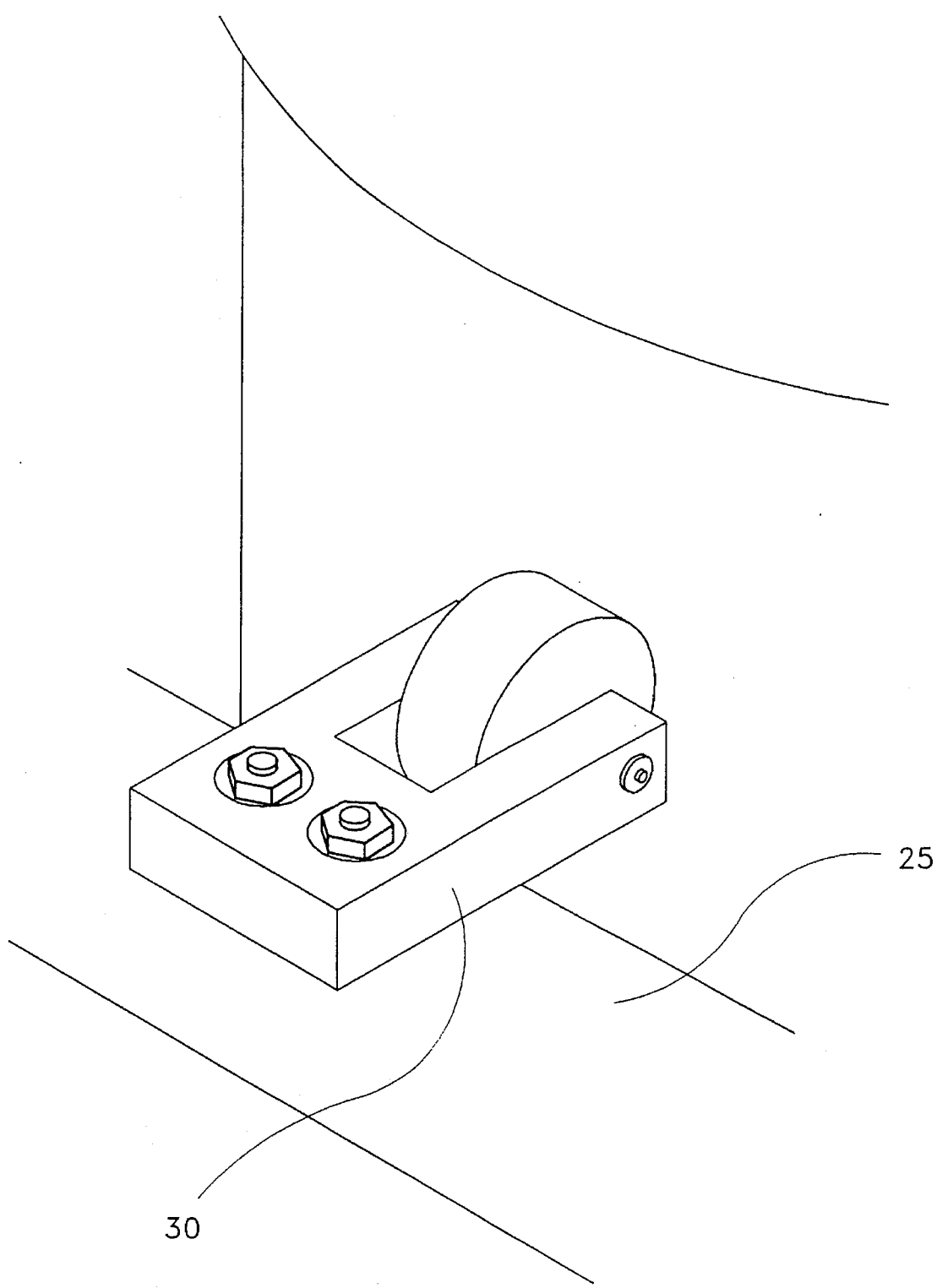
FIG. 4 is a detailed view of a rear roller Which is located at the bottom rear of the drum which is designed to minimize any possible friction in connection with the weighing process.

Furthermore, as shown in FIG. 1, the lifting of the drum 55 will cause the lower portion of the drum 55 to rotate back and rest against the rear rollers 30-30 which are attached to the cross beams supports 25-25, and these rear rollers 30-30 will help reduce any friction during the weighing process. This is also shown in FIG. 4.

In addition, as shown in FIG. 1, when the drum 55 is engaged by two lifting supports 40-40 on each end of the raising bar 50, behind the center diameter of the drum 55, this positioning of the lifting supports 40-40 will cause the bottom of the drum 55 to slightly swing back against the rear rollers 30-30 creating a very stable means of grasping the drum 55 and at the same time minimizing friction during the weighing process.

While the invention has been described in its preferred embodiment, it is to be appreciated that variations therefrom may be made without departing from the true scope and spirit of the invention.

What is claimed is:

1. A combination carrier and force measuring device for a container provided with a circular ring having a circumferential section extending outwardly horizontally essentially entirely around the top portion of said container comprising:

a carrier body provided with means for moving said carrier body readily on a surface, a pair of supports on said carrier body adapted only to engage said ring thereunder at oppositely disposed points on said outwardly extending circumferential section only of said ring, said oppositely disposed points being on other than a diameter of said ring, said pair of supports being on the same side of said diameter of said ring, means for only vertically raising said supports on said carrier body, said pair of supports contacting said container being the only means for vertically lifting said container, means limiting the horizontal movement of the lower portion of said container below said ring while said container is being raised and while said carrier moves said container from place to place, a force measuring device for measuring the force of gravity on said container being carried, depending from said means for only vertically raising said supports on said carrier body and engaging said pair of supports, whereby said force measuring device can measure said force of gravity at any vertical lift position, and a display on said carrier for showing the amount of said force of gravity being measured.

2. The combination carrier and force measuring device of claim 1, wherein said means for moving said carrier body readily on a surface comprises wheels.

3. The combination carrier and force measuring device of claim 1, wherein said means for vertically raising said pair of supports includes pneumatic means using stored air.

4. The combination and force measuring device of claim 3, wherein said pneumatic means for vertically raising said pair of supports includes a manually controlled air cylinder.

5. The combination carrier and force measuring device of claim 1, wherein said pair of supports includes vertical guide means.

6. The combination carrier and force measuring device of claim 1, wherein said means for causing said supports on said carrier body to be raised only vertically includes means to minimize friction where said supports come in contact with said carrier body.

7. The combination carrier and force measuring device of claim 1 wherein the means limiting the horizontal movement of the lower portion of said container below said ring while said container is being raised and while said carrier moves said container from place to place involves a mechanism to provide rolling contact between said means limiting the horizontal movement of the lower portion of said container and said combination carrier and force measuring device.

* * * * *